US011515526B2

(12) United States Patent
Chae et al.

(10) Patent No.: US 11,515,526 B2
(45) Date of Patent: Nov. 29, 2022

(54) METHOD FOR MANUFACTURING NEGATIVE ELECTRODE AND NEGATIVE ELECTRODE OBTAINED THEREFROM

(71) Applicant: LG CHEM, LTD., Seoul (KR)

(72) Inventors: Oh-Byong Chae, Daejeon (KR); Sang-Wook Woo, Daejeon (KR); Je-Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 74 days.

(21) Appl. No.: 16/641,843

(22) PCT Filed: Mar. 20, 2019

(86) PCT No.: PCT/KR2019/003266
§ 371 (c)(1),
(2) Date: Feb. 25, 2020

(87) PCT Pub. No.: WO2019/182361
PCT Pub. Date: Sep. 26, 2019

(65) Prior Publication Data
US 2021/0159491 A1 May 27, 2021

(30) Foreign Application Priority Data
Mar. 20, 2018 (KR) .................. 10-2018-0032219

(51) Int. Cl.
*H01M 4/36* (2006.01)
*H01M 4/04* (2006.01)
(Continued)

(52) U.S. Cl.
CPC .......... *H01M 4/366* (2013.01); *H01M 4/043* (2013.01); *H01M 4/0416* (2013.01);
(Continued)

(58) Field of Classification Search
CPC .... H01M 4/366; H01M 4/0416; H01M 4/043; H01M 4/0471; H01M 4/133; H01M 4/661; H01M 10/0525; H01M 2004/027
See application file for complete search history.

(56) References Cited

U.S. PATENT DOCUMENTS 6,001,139 A    12/1999  Asanuma et al.
10,833,324 B2 * 11/2020  Zhong ................... H01M 4/382
(Continued)

FOREIGN PATENT DOCUMENTS

CN    105702943 A    6/2016
EP    3 477 754 A1   5/2019
(Continued)

OTHER PUBLICATIONS

Holtstiege, Florian; Bärmann, Peer; Nölle, Roman; Winter, Martin; Placke, Tobias, "Pre-Lithiation Strategies for Rechargeable Energy Storage Technologies: Concepts, Promises and Challenges," Jan. 23, 2018, MDPI, Batteries, Apr. 4, 2018, pp. 9, 12-13. (Year: 2018).*

(Continued)

*Primary Examiner* — Matthew T Martin
*Assistant Examiner* — Katharine A Caughron
(74) *Attorney, Agent, or Firm* — Birch, Stewart, Kolasch & Birch, LLP

(57) ABSTRACT

A method for manufacturing a lithium secondary battery, including the steps: (S1) forming a preliminary negative electrode by coating a negative electrode slurry including a negative electrode active material, conductive material, binder and a solvent onto at least one surface of a current collector, followed by drying and pressing the negative electrode slurry coated current collector, to form a negative electrode active material layer surface on the current collector; (S2) coating lithium metal foil onto the negative
(Continued)

electrode active material layer surface of the preliminary negative electrode in the shape of a pattern in which pattern units are arranged; (S3) cutting the preliminary negative electrode on which the lithium metal foil is pattern-coated to obtain negative electrode units; (S4) impregnating the negative electrode units with an electrolyte to obtain a pre-lithiated negative electrode; and (S5) assembling the negative electrode obtained from step (S4) with a positive electrode and a separator.

8 Claims, 3 Drawing Sheets

(51) Int. Cl.
    *H01M 4/133*     (2010.01)
    *H01M 4/134*     (2010.01)
    *H01M 4/62*      (2006.01)
    *H01M 4/66*      (2006.01)
    *H01M 10/0525*   (2010.01)
    *H01M 4/02*      (2006.01)

(52) U.S. Cl.
    CPC ......... *H01M 4/0471* (2013.01); *H01M 4/133* (2013.01); *H01M 4/134* (2013.01); *H01M 4/364* (2013.01); *H01M 4/621* (2013.01); *H01M 4/661* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2005/0130043 A1 | 6/2005 | Gao et al. |
| 2006/0110661 A1 | 5/2006 | Lee et al. |
| 2015/0333385 A1 | 11/2015 | Sun et al. |
| 2016/0126023 A1* | 5/2016 | Cao ........................ H01G 11/06 361/502 |
| 2016/0141596 A1 | 5/2016 | Uhm et al. |
| 2016/0204431 A1 | 7/2016 | Sawa |
| 2017/0062815 A1 | 3/2017 | Zhong |
| 2017/0301485 A1 | 10/2017 | Cao et al. |
| 2017/0338480 A1 | 11/2017 | Kim et al. |
| 2018/0254472 A1 | 9/2018 | Ahn et al. |
| 2019/0356014 A1* | 11/2019 | Abe ........................ H01M 4/483 |
| 2021/0135274 A1* | 5/2021 | Chae ........................ H01M 4/661 |

FOREIGN PATENT DOCUMENTS

| | | |
|---|---|---|
| JP | 6-140028 A | 5/1994 |
| JP | 2007-305596 A | 11/2007 |
| KR | 10-2003-0023818 A | 3/2003 |
| KR | 10-2006-0056969 A | 5/2006 |
| KR | 10-0582557 B1 | 5/2006 |
| KR | 10-2012-0092529 A | 8/2012 |
| KR | 10-2015-0014676 A | 2/2015 |
| KR | 10-2015-0089966 A | 8/2015 |
| KR | 10-2016-0094652 A | 8/2016 |
| KR | 10-2017-0014216 A | 2/2017 |
| KR | 10-2017-0140635 A | 12/2017 |
| KR | 10-2018-0001229 A | 1/2018 |
| WO | WO 2015/045341 A1 | 4/2015 |

OTHER PUBLICATIONS

Extended European Search Report for European Application No. 19771006.4, dated Nov. 5, 2020.
International Search Report issued in PCT/KR2019/003266 (PCT/ISA/210), dated Jul. 3, 2019.

* cited by examiner

METHOD FOR MANUFACTURING NEGATIVE ELECTRODE AND NEGATIVE ELECTRODE OBTAINED THEREFROM

TECHNICAL FIELD

The present application claims priority to Korean Patent Application No. 10-2018-0032219 filed on Mar. 20, 2018 in the Republic of Korea. The present disclosure relates to a method for manufacturing a negative electrode. More particularly, the present disclosure relates to a method for manufacturing a pre-lithiated negative electrode which can improve the initial efficiency of a negative electrode.

BACKGROUND ART

As technological development and demand for mobile instruments have been increased, rechargeable secondary batteries have been increasingly in demand as energy sources. Among such secondary batteries, lithium secondary batteries having high energy density and voltage, long cycle life and a low discharge rate have been commercialized and used widely.

A lithium secondary battery includes a positive electrode, a negative electrode, a separator interposed between the positive electrode and negative electrode to isolate them from each other, and an electrolyte communicating electrochemically with the positive electrode and negative electrode.

Such a lithium secondary battery is generally obtained by using a lithium-intercalated compound, such as $LiCoO_2$ or $LiMn_2O_4$ for the positive electrode, and a non-lithium intercalated compound, such as a carbonaceous or Si-based material for the negative electrode. During charge, the lithium ions intercalated to the positive electrode move to the negative electrode through the electrolyte. During discharge, the lithium ions move back to the positive electrode from the negative electrode. During charge, lithium moving from the positive electrode to the negative electrode reacts with the electrolyte to form a kind of passivation film, solid electrolyte interface (SEI), on the surface of the negative electrode. The SEI inhibits transport of electrons required for the reaction of the negative electrode with the electrolyte to prevent decomposition of the electrolyte, thereby stabilizing the structure of the negative electrode. On the other hand, formation of SEI is irreversible to cause consumption of lithium ions. In other words, lithium consumed by the formation of SEI cannot be returned to the positive electrode during the subsequent discharge process, resulting in a drop in battery capacity. This is called irreversible capacity. In addition, since the charge/discharge efficiency of the positive electrode and negative electrode of a secondary battery is not perfectly 100%, consumption of lithium ions is generated, as cycles proceed, to cause a drop in electrode capacity, resulting in degradation of cycle life. Particularly, when a Si-based material is used for the negative electrode for the purpose of high capacity, the initial irreversible capacity is high and the initial efficiency is low due to depletion of lithium.

Therefore, there has been an attempt to carry out pre-lithiation to reduce the initial irreversibility of a negative electrode. In other words, before manufacturing a battery, irreversible reaction of a negative electrode is carried out preliminarily or some lithium is intercalated to the negative electrode in advance to ensure initial reversibility in order to improve capacity and electrochemical characteristics of a battery.

For example, the pre-lithiation has been carried out by attaching lithium metal to a negative electrode material or a negative electrode layer including the same through a deposition or powder coating process, interposing a separator between the thus obtained negative electrode and a positive electrode to assemble a battery cell, and injecting an electrolyte thereto. When an electrolyte is injected after the assemblage of a cell as mentioned above, lithium is ionized through the reaction between the lithium metal attached to the negative electrode layer and the electrolyte and then is intercalated into the negative electrode layer, while the sites in lithium metal from which lithium ions are released remain as vacant spaces in the cell. As a result, a spacing phenomenon is generated in the positive electrode/separator/negative electrode forming the cell, thereby interrupting smooth charge/discharge.

In addition, since lithium metal used for pre-lithiation is expensive, attachment of lithium metal to the whole negative electrode is economically disadvantageous. In addition, reduction of the electrolyte is increased during pre-lithiation due to excessive lithium, resulting in over-consumption of the electrolyte and electrochemical side effects caused by byproducts.

DISCLOSURE

Technical Problem

The present disclosure is designed to solve the problems of the related art, and therefore the present disclosure is directed to providing a method for manufacturing a lithium secondary battery, wherein a pre-lithiation step intended to compensate the irreversible capacity of a negative electrode is carried out in a cost-efficient manner without any waste of lithium metal, and contact property of positive electrode/separator/negative electrode is improved after manufacturing the battery.

The present disclosure is also directed to providing a lithium secondary battery obtained from the method.

Technical Solution

According to an embodiment of present disclosure, there is provided a method for manufacturing a secondary battery, including the steps of: (S1) forming a preliminary negative electrode by coating a negative electrode slurry including a negative electrode active material, conductive material, binder and a solvent onto at least one surface of a current collector, followed by drying and pressing the negative electrode slurry coated current collector, to form a negative electrode active material layer surface on the current collector; (S2) coating lithium metal foil onto the negative electrode active material layer surface of the preliminary negative electrode in the shape of a pattern in which pattern units are arranged; (S3) cutting the preliminary negative electrode on which the lithium metal foil is pattern-coated to obtain negative electrode units; (S4) impregnating the negative electrode units with an electrolyte to obtain a pre-lithiated negative electrode; and (S5) assembling the negative electrode obtained from step (S4) with a positive electrode and a separator, wherein step (S3) is carried out by cutting the preliminary negative electrode where each pattern unit is positioned at the central portion of each negative electrode unit and occupies an area equal to or larger than 10% and smaller than 100% of the negative electrode unit surface.

According to the second embodiment of the present disclosure, there is provided the method for manufacturing a secondary battery as defined in the first embodiment, wherein step (S3) is carried out by cutting the preliminary negative electrode where the lithium metal foil pattern unit is positioned at the central portion of the negative electrode unit and occupies an area corresponding to 10% to 70% of the negative electrode unit surface.

According to the third embodiment of the present disclosure, there is provided the method for manufacturing a secondary battery as defined in the first or the second embodiment, wherein the ratio of the width of the lithium metal foil pattern unit to that of the a width of a non-coated portion having no lithium metal foil pattern is 99:1 to 10:90, in the negative electrode unit.

According to the fourth embodiment of the present disclosure, there is provided the method for manufacturing a secondary battery as defined in the first to the third embodiments, wherein the ratio of the length of the lithium metal foil pattern unit to a length of a non-coated portion having no lithium metal foil pattern is 99:1 to 10:90, in the negative electrode unit.

According to the fifth embodiment of the present disclosure, there is provided the method for manufacturing a secondary battery as defined in the first to the fourth embodiments, wherein the pattern coating in step (S2) is carried out at a temperature of 10° C. to 200° C. under a linear pressure condition of 0.2 kN/cm to 30 kN/cm.

According to the sixth embodiment of the present disclosure, there is provided the method for manufacturing a secondary battery as defined in the first to the fifth embodiments, wherein the impregnation with an electrolyte is carried out for 2 hours to 48 hours in step (S4).

According to the seventh embodiment of the present disclosure, there is provided the method for manufacturing a secondary battery as defined in the first to the sixth embodiments, which further includes step (S5) of washing and drying the pre-lithiated negative electrode, after impregnating with an electrolyte in step (S4).

According to the eighth embodiment of the present disclosure, there is provided the method for manufacturing a secondary battery as defined in the first to the seventh embodiments, wherein the electrolyte includes a lithium salt and an organic solvent.

According to the ninth embodiment of the present disclosure, there is provided the method for manufacturing a secondary battery as defined in the first to the eighth embodiments, wherein the negative electrode active material layer includes, as an active material, one or more selected from the group consisting of a Si-based material, Sn-based material, and carbonaceous material.

According to the tenth embodiment of the present disclosure, there is provided a lithium secondary battery obtained by the method as defined in any one of the first to the ninth embodiments.

According to the eleventh embodiment of the present disclosure, there is provided the lithium secondary battery as defined in the tenth embodiment, wherein the lithium secondary battery has an initial efficiency of 80% or more and a capacity maintenance of 80% or more, and has a spacing of 1 µm or more between the negative electrode and the separator in an area of 5% or less of the total area of the negative electrode after charging and discharging.

Advantageous Effects

According to an embodiment of the present disclosure, a negative electrode subjected to pre-lithiation in advance by carrying out pattern-coating of lithium metal foil onto the surface of a negative electrode active material layer, followed by cutting and impregnation with an electrolyte, is assembled with a positive electrode and a separator. Thus, the whole amount of lithium metal may be used for pre-lithiation to ensure initial reversibility without any waste of lithium metal. In addition, it is possible to minimize a spacing phenomenon in the positive electrode/separator/negative electrode after the assemblage of a battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect, there is provided a method for manufacturing a lithium secondary battery. FIG. 1 show schematic views illustrating the process for manufacturing a lithium secondary battery according to an embodiment of the present disclosure.

Figure 1A:
FIGS. 1a to 1d are schematic views illustrating the process for manufacturing a lithium secondary battery according to an embodiment of the present disclosure.

First, as shown in FIG. 1a, a negative electrode active material layer 14 is formed on at least one surface of a current collector 12 to provide a preliminary negative electrode (S1). According to the present disclosure, the preliminary negative electrode may be a planar negative electrode sheet for producing a negative electrode. In other words, as described hereinafter, the preliminary negative electrode is cut into a suitable size and shape depending on the battery to be manufactured finally. Thus, at least one negative electrode member may be produced from the preliminary negative electrode. In addition, according to the present disclosure, each of the negative electrode members obtained by cutting the preliminary negative electrode may be called a negative electrode unit 10: The negative electrode active material layer 14 of the preliminary negative electrode may be formed by coating negative electrode slurry prepared by dispersing a negative electrode active material, conductive material and a binder in a solvent to at least one surface of a current collector 12, followed by drying and pressing.

The negative electrode active material may include a Si-based material, Sn-based material, carbonaceous material, or a mixture of at least two of them.

In this case, the carbonaceous material may be at least one selected from the group consisting of crystalline artificial graphite, crystalline natural graphite, amorphous hard carbon, low crystalline soft carbon, carbon black, acetylene black, Ketjen black, Super P, graphene and fibrous carbon. Preferably, the carbonaceous material may be crystalline artificial graphite and/or crystalline natural graphite. The Si-based material may include Si, SiO, $SiO_2$, or the like, and the Sn-based material may include Sn, SnO, $SnO_2$, or the like.

In addition to the above-mentioned materials, the negative electrode active material may include: metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; metal oxides, such as PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like.

The negative electrode active material may be used in an amount of 80-99 wt % based on the total weight of the negative electrode slurry The binder is an ingredient which assists binding between the conductive material and the active material and binding to the current collector. In general, the binder is added in an amount of 0.1-20 wt % based on the total weight of the negative electrode slurry. Particular examples of the binder include polyvinylidene fluoride-co-hexafluoropropylene (PVDF-co-HFP), polyvinylidene fluoride (PVDF), polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylic acid, styrene butadiene rubber (SBR), or the like. Carboxymethyl cellulose (CMC) may also be used as a thickening agent for controlling the viscosity of slurry.

The conductive material is not particularly limited, as long as it has conductivity while not causing any chemical change in the corresponding battery. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; and conductive materials, such as polyphenylene derivatives. The conductive material may be added in an amount of 0.1-20 wt % based on the total weight of the electrode slurry composition.

The solvent may include water or an organic solvent, such as N-methyl-2-pyrrolidone (NMP), and may be used in such an amount that the negative electrode slurry including the negative electrode material optionally with a binder and conductive material may have desired viscosity. For example, the solvent may be used in such a manner that the solid content in the negative electrode slurry may be 50-95 wt %, preferably 70-90 wt %.

The current collector is not particularly limited, as long as it has high conductivity while not causing any chemical change in the corresponding battery. Particular examples of the current collector include copper, stainless steel, aluminum, nickel, titanium, baked carbon, copper or stainless steel surface-treated with carbon, nickel, titanium, silver, or the like, aluminum-cadmium alloy, or the like. The thickness of the current collector is not particularly limited but the current collector may have a currently applicable thickness of 3-500 μm.

There is no particular limitation in the coating process of the negative electrode slurry, as long as it is a method used currently in the art. For example, a coating process using a slot die may be used. In addition to this, a Mayer bar coating process, gravure coating process, dip coating process, spray coating process, etc. may be used.

Figure 1B:
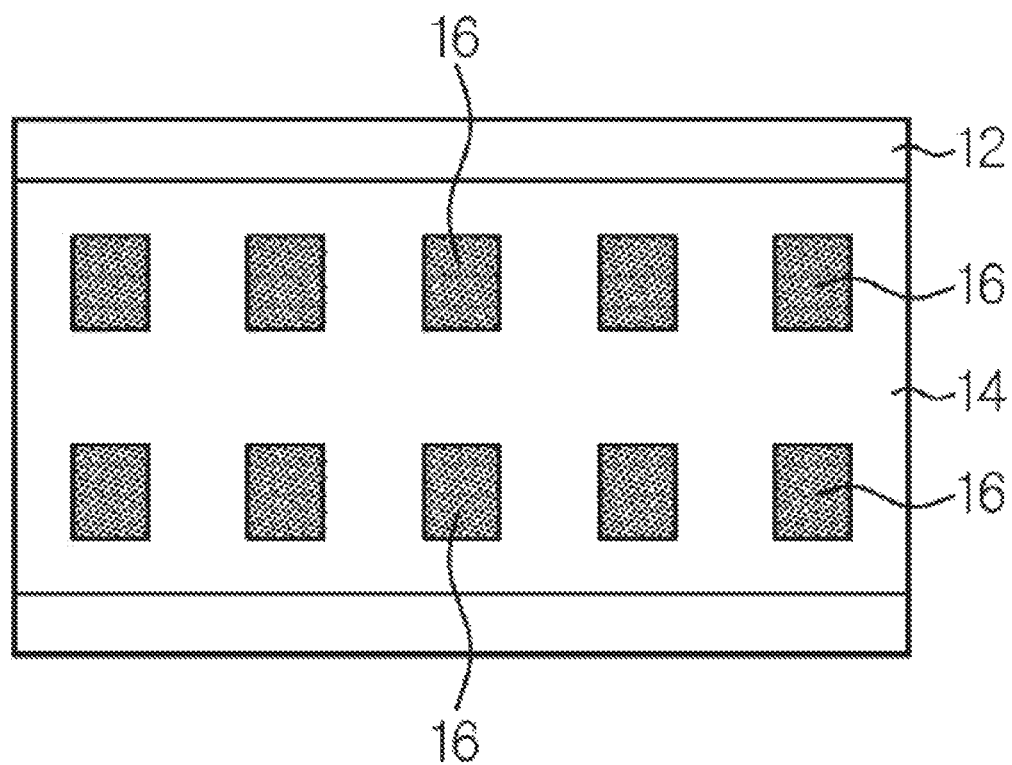

Next, as shown in FIG. 1b, lithium metal foil 16 is coated on the negative electrode active material layer 14 surface of the preliminary negative electrode in the shape of a pattern (S2). According to an embodiment of the present disclosure, the pattern coating may be carried out in such a manner that pattern units 16 having a desired size may be arranged on the surface of the preliminary electrode while being spaced apart from each other with a predetermined interval. Herein, the preliminary negative electrode may be supplied in a roll-to-roll manner.

The pattern coating of lithium metal foil may be carried out by cutting lithium metal foil into a desired size and shape to prepare at least one pattern unit(s), and disposing the pattern unit(s) on the surface of the negative electrode active material layer, followed by compression. According to an embodiment of the present disclosure, the shapes and sizes of the pattern unit(s) are not particularly limited. For example, as shown in FIG. 1b, the pattern unit(s) may be prepared in a quadrangular shape. Herein, compression may be carried out at a temperature of 10-200° C. under a linear pressure condition of 0.2-30 kN/cm, considering the adhesion between the negative electrode active material layer and lithium metal foil. In addition, the lithium metal foil may have a thickness of 5-200 μm, but is not limited thereto.

When such pattern coating is carried out, it is possible to use lithium metal partially in a portion of the negative electrode pattern-coated with lithium metal, and thus to prevent waste of expensive lithium metal. In addition, when lithium metal is attached to the whole negative electrode according to the related art, there is a problem in that reduction of an electrolyte is increased during pre-lithiation due to excessive lithium, resulting in over-consumption of the electrolyte and electrochemical side effects caused by byproducts. According to the present disclosure, it is possible to solve the above-mentioned problem.

Figure 1C:
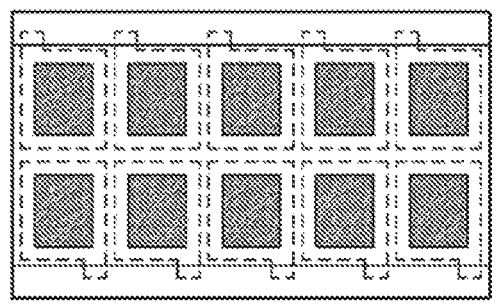
Figure 1C:
Figure 1C:
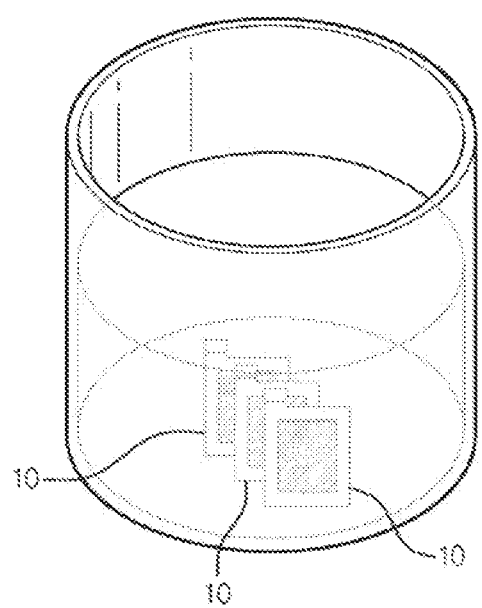

Then, as shown in FIG. 1c, the preliminary negative electrode pattern-coated with the pattern unit(s) of lithium metal foil is cut into a suitable size to obtain negative electrode units (S3). Herein, the preliminary negative electrode is cut into such a shape and size that at least one pattern unit may be positioned at the central portion of the negative electrode unit surface. Referring to FIG. 1c, one pattern unit is positioned at the center of one negative electrode unit surface. After that, the obtained negative electrode unit is impregnated with an electrolyte to obtain a pre-lithiated negative electrode 10 (S4).

According to the present disclosure, the preliminary negative electrode is cut in such a manner that the lithium metal foil pattern unit is positioned at the central portion of the negative electrode active material layer surface, while it occupies only a predetermined partial area of the negative electrode active material layer surface of the negative electrode unit. In other words, the pattern unit does not cover the whole electrode active material layer surface of the negative electrode unit, and the electrode active material layer surface includes a non-coated portion which is not covered with the pattern unit. Herein, the cutting step may be carried out by using a cutting system provided with a cutting die and a blade facing the cutting die in a vertical pressurization mode, with the proviso that the lithium metal foil pattern unit is positioned at the central portion of the negative electrode unit, while it occupies an area equal to or larger than 10% and smaller than 100%, preferably an area of 10-70%, and more preferably 10-30%, of the negative electrode unit. In other words, the lithium metal foil pattern is not in contact with the blade of the cutting system during the cutting step. As a result, in the cut preliminary negative electrode, the ratio of the width (or length) of the lithium metal foil pattern to that of the non-coated portion having no lithium metal foil pattern may satisfy a range of 99:1-10:90. Referring to FIG. 1c, the circumference of the pattern unit is spaced apart from that of the negative electrode unit by a predetermined width, and the circumferences are disposed in such a manner that they are not overlapped with each other or they do not meet each other. When pre-lithiation is carried out after cutting a portion of the negative electrode including the lithium metal pattern at the central portion thereof in the above-mentioned manner, there is no waste of lithium metal and lithium metal foil is not pushed down toward the current collector during the cutting. Thus, it is possible to prevent degradation of cell performance.

On the contrary, when the lithium metal foil pattern occupies 100% of the negative electrode unit (for example, when the negative electrode unit is obtained by cutting a negative electrode including a negative electrode active material layer totally coated with lithium metal foil into a desired size), a significant amount of lithium metal applied to the outer region of the cut portion is to be discarded, resulting in degradation of cost-efficiency. In addition, during the cutting, a part of lithium metal foil may be in contact with the blade of the cutting system and pushed down to the current collector. In this case, lithium metal attached to the current collector may not be used for pre-lithiation during the impregnation with an electrolyte but is present in a metallic form, resulting in side reactions during the charge/discharge of a battery.

Meanwhile, when the area of lithium metal foil pattern is less than 10% in each of the negative electrode portions after cutting (i.e. when the pattern unit occupies an area less than 10% of the negative electrode unit), it is not possible to accomplish pre-lithiation of a negative electrode sufficiently.

In step (S4), while the preliminary electrode (i.e. negative electrode unit) is impregnated with an electrolyte, the lithium metal foil pattern unit reacts with an electrolyte to carry out pre-lithiation so that lithium may be ionized and the generated lithium ions may be intercalated into the negative electrode layer. As a result, the pattern units of lithium metal foil disappear. In other words, according to the present disclosure, pre-lithiation of the negative electrode is performed before the assemblage of a battery. Therefore, it is possible for the constitutional elements of the battery to retain good contact with one another while not causing a spacing phenomenon.

Therefore, it is possible to overcome a disadvantage of the conventional pre-lithiation method in which the sites, from which lithium ions are released through the reaction of lithium metal with an electrolyte upon the injection of the electrolyte after the assemblage of the battery, are spaced and interrupt smooth charge/discharge.

The electrolyte impregnation step is carried out advantageously at room temperature for 2-48 hours for the purpose of uniform and stable pre-lithiation of the whole negative electrode.

The electrolyte includes a lithium salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent used for the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Figure 1D:
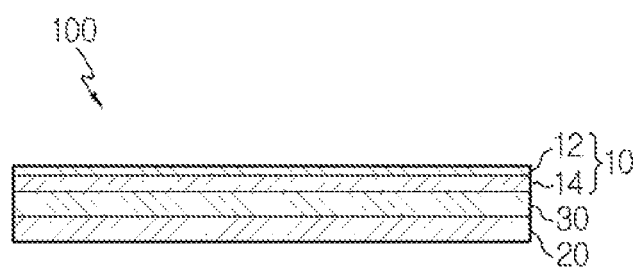

After manufacturing the pre-lithiated negative electrode 10, a separator 30 is interposed between the negative electrode 10 and a positive electrode 20 to form an electrode assembly 100, as shown in FIG. 1d (S5).

The positive electrode may be obtained by mixing a positive electrode active material, conductive material, binder and a solvent to form slurry and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the separator may be a porous polymer film made of a polyolefininc polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

Then, the electrode assembly may be introduced to a pouch, cylindrical battery casing or a prismatic battery casing, and then injecting the electrolyte thereto to finish a secondary battery. Otherwise, the lithium secondary battery may be obtained by stacking the electrode assemblies, impregnating the stack with the electrolyte, and introducing the resultant product to a battery casing, followed by sealing.

Since the lithium secondary battery according to the present disclosure includes the above-described pre-lithiated negative electrode, it is possible to compensate the irreversible capacity of the negative electrode, and thus to satisfy a high initial efficiency and capacity maintenance, such as an initial efficiency of 80% or more and a capacity maintenance of 80% or more. In addition, the lithium secondary battery according to the present disclosure minimizes a spacing phenomenon in the positive electrode/separator/negative electrode caused by pre-lithiation. As a result, when the electrode assembly is disassembled after charge/discharge and the thickness of the negative electrode and that of the separator are measured, the area showing a spacing of 1 μm or more between the negative electrode and the separator may be 5% or less of the total area of the negative electrode.

According to an embodiment of the present disclosure, the lithium secondary battery may be a stacked, wound, stacked and folded or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size batteries include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Examples 1 and 2 and Comparative Examples 1-4: Manufacture of Lithium Secondary Batteries Example 1

Step 1

First, 92 wt % of a mixture of graphite and SiO (weight ratio 7:3) as a negative electrode active material, 3 wt % of carbon black (Denka black, conductive material), 3.5 wt % of styrene butadiene rubber (SBR, binder) and 1.5 wt % of carboxymethyl cellulose (CMC, thickening agent) were added to water as a solvent to obtain negative electrode slurry. The slurry was coated onto one surface of a copper current collector, followed by drying and pressing, to form a negative electrode active material layer, thereby providing a preliminary negative electrode.

Step 2

Lithium metal foil having a thickness of 40 μm was cut into a size of 1 cm (width)×2 cm (length) to obtain a plurality of pattern units. The pattern units were disposed and arranged on the active material layer of the preliminary negative electrode with a predetermined interval and compression was carried out at room temperature under a linear pressure of 5 kN/cm.

Step 3

The preliminary negative electrode to which the pattern units of lithium metal foil were attached was cut into a size of a battery to be manufactured, thereby providing negative electrode unit(s). Herein, the pattern unit was positioned at the central portion of each negative electrode unit. In addition, the ratio of the area coated with lithium metal foil on the surface of each negative electrode unit was 12%. Then, the negative electrode unit(s) was impregnated with an electrolyte containing 1M $LiPF_6$ dissolved in a mixed solvent including ethylene carbonate (EC) and ethyl methyl carbonate (EMC) at a volume ratio of 50:50. After 24 hours, the negative electrode unit(s) were taken out, washed with dimethyl carbonate (DMC) and dried to obtain a pre-lithiated negative electrode.

Step 4

A polyolefin separator was interposed between the pre-lithiated negative electrode and a $LiCoO_2$ electrode used as a positive electrode, and then an electrolyte containing 1M $LiPF_6$ dissolved in a mixed solvent including ethylene carbonate (EC) and ethyl methyl carbonate (EMC) at a volume ratio of 50:50 was injected thereto to obtain a coin-type bi-cell.

Example 2

Step 1

First, 92 wt % of a mixture of graphite and SiO (weight ratio 7:3) as a negative electrode active material, 3 wt % of carbon black (Denka black, conductive material), 3.5 wt % of SBR (binder) and 1.5 wt % of CMC (thickening agent) were added to water as a solvent to obtain negative electrode slurry. The slurry was coated onto one surface of a copper current collector, followed by drying and pressing, to form a negative electrode active material layer, thereby providing a preliminary negative electrode.

Step 2

Lithium metal foil having a thickness of 20 μm was cut into a size of 2 cm (width)×2 cm (length) to obtain a plurality of pattern units. The pattern units were disposed and arranged on the active material layer of the preliminary negative electrode with a predetermined interval and compression was carried out at room temperature under a linear pressure of 5 kN/cm.

Step 3

The preliminary negative electrode to which the pattern units of lithium metal foil were attached was cut into a size of a battery to be manufactured, thereby providing negative electrode unit(s). Herein, the pattern unit was positioned at the central portion of each negative electrode unit. In addition, the ratio of the area coated with lithium metal foil on the surface of each negative electrode unit was 24%. Then, the negative electrode unit(s) was impregnated with an electrolyte containing 1M $LiPF_6$ dissolved in a mixed solvent including ethylene carbonate (EC) and ethyl methyl carbonate (EMC) at a volume ratio of 50:50. After 24 hours, the negative electrode unit(s) were taken out, washed with DMC and dried to obtain a pre-lithiated negative electrode.

Step 4

A polyolefin separator was interposed between the pre-lithiated negative electrode and a $LiCoO_2$ electrode used as a positive electrode, and then an electrolyte containing 1M $LiPF_6$ dissolved in a mixed solvent including ethylene carbonate (EC) and ethyl methyl carbonate (EMC) at a volume ratio of 50:50 was injected thereto to obtain a coin-type bi-cell.

Comparative Example 1

Step 1

First, 92 wt % of a mixture of graphite and SiO (weight ratio 7:3) as a negative electrode active material, 3 wt % of carbon black (Denka black, conductive material), 3.5 wt % of SBR (binder) and 1.5 wt % of CMC (thickening agent) were added to water as a solvent to obtain negative electrode slurry. The slurry was coated onto one surface of a copper current collector, followed by drying and pressing, to form a negative electrode active material layer, thereby providing a preliminary negative electrode.

Step 2

Lithium metal foil having a thickness of 5 μm was applied to the whole negative electrode active material layer of the preliminary negative electrode, and compression was carried out at room temperature under a linear pressure of 5 kN/cm.

Step 3

The preliminary negative electrode to which lithium metal foil was attached was cut to obtain a plurality of negative electrode units. The negative electrode units were cut into a size of the battery to be manufactured. Then, the negative electrode units were impregnated with an electrolyte containing 1M $LiPF_6$ dissolved in a mixed solvent including ethylene carbonate (EC) and ethyl methyl carbonate (EMC) at a volume ratio of 50:50. After 24 hours, the negative electrode unit(s) were taken out, washed with DMC and dried to obtain a pre-lithiated negative electrode.

Step 4

A polyolefin separator was interposed between the pre-lithiated negative electrode and a $LiCoO_2$ electrode used as a positive electrode, and then an electrolyte containing 1M $LiPF_6$ dissolved in a mixed solvent including ethylene carbonate (EC) and ethyl methyl carbonate (EMC) at a volume ratio of 50:50 was injected thereto to obtain a coin-type bi-cell.

Comparative Example 2

Step 1

First, 92 wt % of a mixture of graphite and SiO (weight ratio 7:3) as a negative electrode active material, 3 wt % of carbon black (Denka black, conductive material), 3.5 wt % of SBR (binder) and 1.5 wt % of CMC (thickening agent) were added to water as a solvent to obtain negative electrode slurry. The slurry was coated onto one surface of a copper current collector, followed by drying and pressing, to form a negative electrode active material layer, thereby providing a preliminary negative electrode.

Step 2

Lithium metal foil having a thickness of 100 μm was cut into a size of 0.4 cm (width)×2 cm (length) to obtain a plurality of pattern units. The pattern units were disposed and arranged on the active material layer of the preliminary negative electrode with a predetermined interval and compression was carried out at room temperature under a linear pressure of 5 kN/cm.

Step 3

The preliminary negative electrode to which the pattern units of lithium metal foil were attached was cut into a size of a battery to be manufactured, thereby providing negative electrode unit(s). Herein, the pattern unit was positioned at the central portion of each negative electrode unit. In addition, the ratio of the area coated with lithium metal foil on the surface of each negative electrode unit was 5%. Then, the negative electrode unit(s) was impregnated with an electrolyte containing 1M $LiPF_6$ dissolved in a mixed solvent including ethylene carbonate (EC) and ethyl methyl carbonate (EMC) at a volume ratio of 50:50. After 24 hours, the negative electrode unit(s) were taken out, washed with DMC and dried to obtain a pre-lithiated negative electrode.

Step 4

A polyolefin separator was interposed between the pre-lithiated negative electrode and a $LiCoO_2$ electrode used as a positive electrode, and then an electrolyte containing 1M $LiPF_6$ dissolved in a mixed solvent including ethylene carbonate (EC) and ethyl methyl carbonate (EMC) at a volume ratio of 50:50 was injected thereto to obtain a coin-type bi-cell.

Comparative Example 3

The same procedure as Example 1 was carried out to obtain a coin-type bi-cell, except that Step 3 of Example 1 was not carried out.

Comparative Example 4

First, 92 wt % of a mixture of graphite and SiO (weight ratio 7:3) as a negative electrode active material, 3 wt % of carbon black (Denka black, conductive material), 3.5 wt % of SBR (binder) and 1.5 wt % of CMC (thickening agent) were added to water as a solvent to obtain negative electrode slurry. The slurry was coated onto one surface of a copper current collector, followed by drying and pressing, to form a negative electrode active material layer, thereby providing a negative electrode.

A polyolefin separator was interposed between the negative electrode and a $LiCoO_2$ electrode used as a positive electrode, and then an electrolyte containing 1M $LiPF_6$ dissolved in a mixed solvent including ethylene carbonate (EC) and ethyl methyl carbonate (EMC) at a volume ratio of 50:50 was injected thereto to obtain a coin-type bi-cell.

Test Example 1: Evaluation for Life Characteristics after Charge/Discharge

Each of the cells according to Examples 1 and 2 and Comparative Examples 1-4 was charged/discharged by using an electrochemical charger. Herein, charge was carried out by applying electric current at a current density of 0.1C-rate to a voltage of 4.2V, and discharge was carried out at the same current density to a voltage of 2.5V. Such charge/discharge cycles were repeated 100 times, and then initial efficiency (%) and capacity maintenance (%) were calculated according to the following formulae. The results are shown in the following Table 1.

Initial efficiency (%)=(Discharge capacity at the first cycle/Charge capacity at the first cycle)×100

Capacity Maintenance (%)=(Discharge capacity after 100 cycles/Discharge capacity at the first cycle)×100

Test Example 2: Evaluation for Spacing Between Negative Electrode and Separator

To evaluate a degree of spacing in the cells according to Examples 1 and 2 and Comparative Examples 1-4, each cell was disassembled and the positive electrode was removed to obtain a structure including the negative electrode bound to the separator. The thickness of the negative electrode and separator bound to each other was measured by using a non-contact type laser thickness measuring system, and then by using a contact type thickness measuring system. Then, the percentage of the area having a difference in thickness of 1 μm or more based on the total area of the negative electrode was calculated. The results are shown in the following Table 1.

TABLE 1

|  | Ex. 1 | Ex. 2 | Comp. Ex. 1 | Comp. Ex. 2 | Comp. Ex. 3 | Comp. Ex. 4 |
| --- | --- | --- | --- | --- | --- | --- |
| Area of lithium metal foil in preliminary negative electrode after cutting (%) | 12 | 24 | 100 | 5 | 12 | 0 |
| Initial efficiency (%) | 83.4 | 85.7 | 78.2 | 75.5 | 76.1 | 72.7 |
| Capacity maintenance (%) | 84 | 86 | 77 | 75 | 72 | 71 |
| Area showing spacing between negative electrode and separator (%) | 2 | 1 | 2 | 2 | 14 | 1 |

As can be seen from Table 1, the cells, which include a pre-lithiated negative electrode obtained by cutting a pattern-coated preliminary negative electrode into such a size that the lithium metal foil pattern occupies an area equal to or larger than 10% and smaller than 100% and carrying out impregnation with an electrolyte according to Examples 1 and 2, show high initial efficiency and capacity maintenance, while showing a low degree of spacing between the negative electrode and separator, as compared to those of Comparative Examples 1-4.

Figure 2:
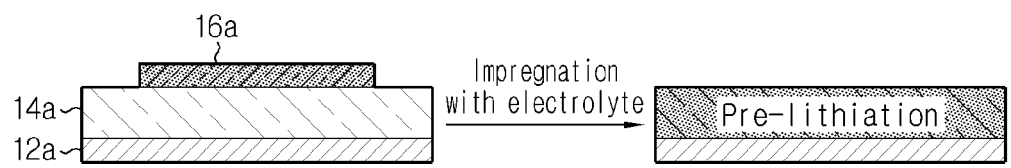
FIG. 2 illustrates a pre-lithiated negative electrode obtained through a cutting step and an electrolyte impregnation step according to Examples 1 and 2.
Figure 3A:
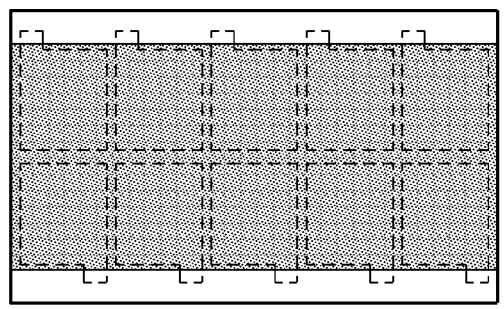
FIGS. 3a and 3b illustrate a pre-lithiated negative electrode obtained through a cutting step and an electrolyte impregnation step, after coating lithium metal foil to the whole negative electrode active material layer surface according to Comparative Example 1.
Figure 3B:
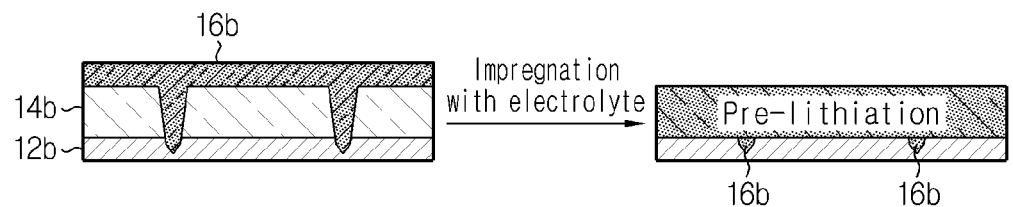

To carry out comparison more particularly, the pre-lithiated negative electrode obtained through a cutting step and an electrolyte impregnation step according to Examples 1 and 2 are shown in FIG. 2, and the pre-lithiated negative electrode obtained through a step of coating lithium metal foil totally on the surface of the negative electrode active material layer, a cutting step and an electrolyte impregnation step according to Comparative Example 1 is shown in FIGS. 3a and 3b.

As can be seen from FIG. 2, when the pattern-coated preliminary negative electrode is cut in such a manner that the lithium metal foil pattern 16a is positioned at the central portion of the negative electrode active material layer 14a of the negative electrode unit and occupies a predetermined area and then impregnation with an electrolyte is carried out, it is though that the lithium metal foil is not in contact with the blade upon cutting and does not pushed down toward the current collector 12a, and thus there is no degradation of the cell performance. In addition, there is provided improved cost-efficiency in that the lithium metal foil used herein can be applied totally to pre-lithiation of the negative electrode.

On the contrary, as can be seen from FIGS. 3a and 3b, when the negative electrode including the lithium metal foil pattern 16b totally coated on the negative electrode active material layer 14b of the negative electrode unit is cut into a desired size and then impregnation with an electrolyte is carried out, a significant amount of lithium metal applied to the outer region of the cut portion should be discarded. In addition, during the cutting, a portion of lithium metal foil is in contact with the cutting blade and is pushed down to the current collector 12b. As a result, upon the impregnation with an electrolyte, lithium metal attached to the current collector is not used for pre-lithiation of the negative electrode but is present in a metallic form. It is thought that the cell including the negative electrode causes side reactions during charge/discharge, resulting in degradation of initial efficiency and capacity maintenance.

Meanwhile, in the case of Comparative Example 2, it is thought that the area occupied by the lithium metal foil pattern in each negative electrode unit is less than 10%, and thus pre-lithiation of the negative electrode cannot be performed sufficiently. In the case of Comparative Example 3, it is thought that since pre-lithiation is induced by injecting an electrolyte after the assemblage of the cell, a spacing phenomenon is generated at the sites (vacant spaces) of lithium metal remaining after lithium metal is ionized and intercalated into the negative electrode, and thus resistance is increased and smooth charge/discharge cannot be carried out, resulting in degradation of cell performance. In addition, in the case of Comparative Example 4, the negative electrode is not pre-lithiated, and thus shows the lowest initial efficiency and capacity maintenance.

What is claimed is:

1. A method for manufacturing a lithium secondary battery, comprising the steps of:
   (S1) forming a preliminary negative electrode by coating a negative electrode slurry comprising a negative electrode active material, conductive material, binder and a solvent onto at least one surface of a current collector, followed by drying and pressing the negative electrode slurry coated current collector, to form a negative electrode active material layer surface on the current collector;
   (S2) coating lithium metal foil onto the negative electrode active material layer surface of the preliminary negative electrode in a shape of a pattern in which pattern units are arranged;
   (S3) cutting the preliminary negative electrode on which the lithium metal foil is pattern-coated to obtain negative electrode units;
   (S4) impregnating the negative electrode units with an electrolyte to obtain a pre-lithiated negative electrode; and
   (S5) assembling the negative electrode obtained from step (S4) with a positive electrode and a separator,
   wherein step (S3) is carried out by cutting the preliminary negative electrode where each pattern unit is positioned at a central portion of each negative electrode unit and occupies an area equal to or larger than 12% and equal to or smaller than 24% of the negative electrode unit surface, and
   wherein a circumference of the pattern unit is spaced apart from a circumference of the negative electrode unit by a predetermined width, and the circumferences do not overlap with each other and do not meet each other.

2. The method for manufacturing the lithium secondary battery according to claim 1, wherein a ratio of a width of the lithium metal foil pattern unit to a width of a non-coated portion having no lithium metal foil pattern is 99:1 to 10:90, in the negative electrode unit.

3. The method for manufacturing the lithium secondary battery according to claim 1, wherein a ratio of a length of the lithium metal foil pattern unit to a length of a non-coated portion having no lithium metal foil pattern is 99:1 to 10:90, in the negative electrode unit.

4. The method for manufacturing the lithium secondary battery according to claim 1, wherein the pattern coating in step (S2) is carried out at a temperature of 10° C. to 200° C. under a linear pressure condition of 0.2 kN/cm to 30 kN/cm.

5. The method for manufacturing the lithium secondary battery according to claim 1, wherein the impregnation with electrolyte is carried out for 2 hours to 48 hours in step (S4).

6. The method for manufacturing the lithium secondary battery according to claim 1, wherein after impregnating with an electrolyte in step (S4) and before step (S5), washing and drying the pre-lithiated negative electrode is carried out.

7. The method for manufacturing the lithium secondary battery according to claim 1, wherein the electrolyte comprises a lithium salt and an organic solvent.

8. The method for manufacturing the lithium secondary battery according to claim 1, wherein the negative electrode active material layer comprises, as an active material, one or more selected from the group consisting of a Si-based material, Sn-based material, and carbonaceous material.

\* \* \* \* \*